(12) United States Patent
Neal et al.

(10) Patent No.: US 6,990,528 B1
(45) Date of Patent: Jan. 24, 2006

(54) SYSTEM AREA NETWORK OF END-TO-END CONTEXT VIA RELIABLE DATAGRAM DOMAINS

(75) Inventors: Danny Marvin Neal, Round Rock, TX (US); Renato John Recio, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 09/692,354

(22) Filed: Oct. 19, 2000

(51) Int. Cl.
*G06F 15/16* (2006.01)

(52) U.S. Cl. ............... 709/232; 709/204; 709/205; 709/206; 709/207; 709/212; 709/222; 709/223; 709/231; 709/236; 709/237; 709/250; 713/152; 713/153; 713/160; 713/161; 713/164; 713/189; 713/200; 713/201; 710/39; 710/40

(58) Field of Classification Search ............... 709/222, 709/223, 204, 205, 206, 207, 212, 231, 232, 709/236, 237, 250; 713/152, 153, 160, 161, 713/164, 189, 200, 201; 710/39, 40
See application file for complete search history.

(56) References Cited

U.S. PATENT DOCUMENTS

| | | | |
|---|---|---|---|
| 4,638,356 A | 1/1987 | Frezza | 358/118 |
| 4,814,984 A | 3/1989 | Thompson | 364/200 |
| 4,939,752 A | 7/1990 | Literati et al. | 375/107 |
| 4,951,225 A | 8/1990 | Lee et al. | 364/513 |
| 4,975,829 A | 12/1990 | Clarey et al. | 364/200 |
| 5,043,981 A | 8/1991 | Firoozmand et al. | 370/85.1 |
| 5,185,736 A | 2/1993 | Tyrrell et al. | 370/55 |
| 5,185,741 A | 2/1993 | Iguchi et al. | 370/110.1 |
| 5,218,680 A | 6/1993 | Farrell et al. | 395/325 |
| 5,402,416 A | 3/1995 | Cieslak et al. | 370/60 |
| 5,461,608 A | 10/1995 | Yoshiyama | 370/16.1 |
| 5,513,368 A | 4/1996 | Garcia, Jr. et al. | 395/842 |

(Continued)

FOREIGN PATENT DOCUMENTS

JP 2002064587 4/2002

(Continued)

OTHER PUBLICATIONS

Nehmer et al, "A Fault Tolerance Approach for Distributed ISDN Control Systems", ACM SIGOPS European Workshop, Proceedings of the fourth workshop on ACM SIGOPS European workshop, 1990, Bologna, Italy, 1990, pp. 1-4.

*Primary Examiner*—John Follansbee
*Assistant Examiner*—Ashok Patel
(74) *Attorney, Agent, or Firm*—Duke W. Yee; Mark E. McBurney; Wayne P. Bailey

(57) ABSTRACT

A method for associating reliable datagram queue pairs with an underlying end-to-end context of a channel adapter is provided. The method comprises storing a reliable datagram domain (RDD) within the context of a reliable datagram queue pair (RD QP). The same RDD is stored within an end-to-end context (EEC). A partitioning key (P_key) is also stored within the EEC. The RDD cannot be accessed by consumer processes. In the case of incoming messages, the P_keys of the incoming data packet and EEC are compared. If P_keys match, then the RDD's of the RD QP and EEC are compared. If the RDD's match, the packet is processed normally. In the case of outgoing messages, the RDD's of the RD QP and EEC are first compared, and if they match, the P_Key of the EEC is inserted into the transport header of the data packet.

21 Claims, 6 Drawing Sheets

U.S. PATENT DOCUMENTS

| | | | | |
|---|---|---|---|---|
| 5,551,066 | A | 8/1996 | Stillman et al. | 455/69 |
| 5,610,980 | A | 3/1997 | Johnson et al. | 380/4 |
| 5,617,424 | A * | 4/1997 | Murayama et al. | 370/389 |
| 5,617,537 | A | 4/1997 | Yamada et al. | 395/200.01 |
| 5,719,938 | A | 2/1998 | Haas et al. | 380/21 |
| 5,729,686 | A | 3/1998 | Heck et al. | 395/200.38 |
| 5,758,083 | A | 5/1998 | Singh et al. | 395/200.53 |
| 5,778,176 | A | 7/1998 | Geihs et al. | 395/200.12 |
| 5,793,968 | A | 8/1998 | Gregerson et al. | 395/200.39 |
| 5,805,072 | A | 9/1998 | Kakemizu | 340/825.03 |
| 5,884,036 | A | 3/1999 | Haley | 395/200.54 |
| 5,907,689 | A | 5/1999 | Tavallaei et al. | 395/290 |
| 5,951,683 | A | 9/1999 | Yuuki et al. | 713/1 |
| 6,032,191 | A | 2/2000 | Chowdhury et al. | 709/238 |
| 6,081,752 | A | 6/2000 | Benson, IV et al. | 700/79 |
| 6,085,238 | A | 7/2000 | Yuasa et al. | 709/223 |
| 6,092,214 | A | 7/2000 | Quoc et al. | 714/4 |
| 6,098,098 | A | 8/2000 | Sandahl et al. | 709/221 |
| 6,108,739 | A | 8/2000 | James et al. | 710/113 |
| 6,115,776 | A | 9/2000 | Reid et al. | 710/260 |
| 6,128,738 | A | 10/2000 | Doyle et al. | 713/185 |
| 6,192,397 | B1 | 2/2001 | Thompson | 709/209 |
| 6,199,133 | B1 | 3/2001 | Schnell | 710/110 |
| 6,222,822 | B1 | 4/2001 | Gerardin et al. | 370/230 |
| 6,269,396 | B1 | 7/2001 | Shah et al. | 709/223 |
| 6,298,376 | B1 | 10/2001 | Rosner et al. | 709/209 |
| 6,304,973 | B1 | 10/2001 | Williams | 713/201 |
| 6,311,321 | B1 | 10/2001 | Agnihotri et al. | 717/1 |
| 6,330,555 | B1 | 12/2001 | Weber | 707/2 |
| 6,341,322 | B1 | 1/2002 | Liu et al. | 710/129 |
| 6,343,320 | B1 | 1/2002 | Fairchild et al. | 709/224 |
| 6,363,411 | B1 | 3/2002 | Dugan et al. | 709/202 |
| 6,363,416 | B1 | 3/2002 | Naeimi et al. | 709/209 |
| 6,363,495 | B1 | 3/2002 | MacKenzie et al. | 714/4 |
| 6,389,432 | B1 | 5/2002 | Pothapragada et al. | 707/205 |
| 6,434,113 | B1 | 8/2002 | Gubbi | 370/216 |
| 6,470,397 | B1 | 10/2002 | Shah et al. | 709/250 |
| 6,496,503 | B1 | 12/2002 | Pelissier et al. | 370/389 |
| 6,507,592 | B1 | 1/2003 | Hurvig et al. | 370/503 |
| 6,529,286 | B1 | 3/2003 | King | 358/1.14 |
| 6,597,956 | B1 | 7/2003 | Aziz et al. | 700/3 |
| 6,636,520 | B1 | 10/2003 | Jason et al. | 370/401 |
| 6,654,363 | B1 | 11/2003 | Li et al. | 370/338 |
| 6,658,417 | B1 | 12/2003 | Stakutis et al. | 707/10 |
| 6,664,978 | B1 | 12/2003 | Kekic et al. | 345/733 |
| 6,665,714 | B1 | 12/2003 | Blumenau et al. | 709/222 |
| 6,674,911 | B1 | 1/2004 | Pearlman et al. | 382/240 |
| 6,694,361 | B1 * | 2/2004 | Shah et al. | 709/222 |
| 6,708,272 | B1 | 3/2004 | McCown et al. | 713/151 |
| 2002/0021307 | A1 | 2/2002 | Glenn et al. | 345/753 |
| 2002/0026517 | A1 | 2/2002 | Watson, Jr. | 709/228 |
| 2002/0073257 | A1 | 6/2002 | Beukema et al. | 710/105 |
| 2002/0133620 | A1 | 9/2002 | Krause | 709/238 |
| 2003/0018787 | A1 | 1/2003 | Neal et al. | 709/227 |
| 2003/0046505 | A1 | 3/2003 | Craddock et al. | 711/165 |
| 2004/0057424 | A1 | 3/2004 | Kokkonen | 370/352 |

FOREIGN PATENT DOCUMENTS

WO      WO 72159 A1 * 11/2000

* cited by examiner

SYSTEM AREA NETWORK OF END-TO-END CONTEXT VIA RELIABLE DATAGRAM DOMAINS

CROSS REFERENCES TO RELATED APPLICATIONS

The present invention is related to applications entitled Method and Apparatus for Pausing a Send Queue without Causing Sympathy Errors, now U.S. Pat. No. 6,766,467; End Node Partitioning using LMC for a System Area Network, Ser. No. 09/692,351; Method and Apparatus for Dynamic Retention of System Area Network Management information in Non-volatile Store, Ser. No. 09/692,365; Method and Apparatus for Retaining Network Security Setting's Across Power Cycles, Ser. No. 09/692,337; Method and Apparatus for Reporting Unauthorized Attempts to Access Nodes in a Network Computing System, Ser. No. 09/692,348; Method and Apparatus for Reliably Choosing a Master Network Manager During Initialization of a Network Computing System, Ser. No. 09/692,346; Method and Apparatus for Ensuring Scalable Mastership During Initialization of a System Area Network, Ser. No. 09/692,341; and Method and Apparatus for Using a Service ID for the Equivalent of Port ID in a Network Computing System, Ser. No. 09/692,352, now abandoned, all of which are filed even date hereof, assigned to the same assignee, and incorporated herein by reference.

BACKGROUND OF THE INVENTION

1. Technical Field

The present invention generally relates to communications between computer systems and more particularly with how a System Area Network (SAN) like InfiniBand Reliable Datagram Queue Pairs (RD QPs) can be associated with one or more End-to-End Contexts at the local host channel adapter.

2. Description of Related Art

In a System Area Network (SAN), the hardware provides a message passing mechanism which can be used for Input/Output devices (I/O) and interprocess communications between general computing nodes (IPC). Consumers access SAN message passing hardware by posting send/receive messages to send/receive work queues on a SAN channel adapter (CA). The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Reliable Datagram Queue Pairs (RD QP's) rely on an underlying HCA facility to provide the reliability attributes. This underlying facility is the End-to-End Context (EEC). A mechanism is needed that provides for SAN RD QP's that can be associated with one or more EEC's at the local HCA and in the process remove the need to associate RD QP's to a specific partition.

SUMMARY OF THE INVENTION

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

This invention describes how a SAN fabric Reliable Datagram Queue Pairs (RD QPs) can be associated with one or more End—End Contexts (EEC) at the local Host Channel Adapter and in the process removing the need to associate RD QPs to a specific partition, but rather to use the partition association of the underlying End—End Context.

A SAN fabric provides direct user access to network message passing hardware. For four of the five SAN Service Types, a consumer process is given one, or more, QPs which are dedicated to the consumer. The four SAN Service Types which provide this level of access control are: Reliable Connected, Unreliable Connected, Unreliable Datagram, and Raw Datagram.

For the SAN Reliable Datagram Service Type, each SAN consumer gets one, or more, dedicated QPs. However, the RD QPs rely on an underlying HCA facility to provide the reliability attributes. This underlying facility is the SAN EEC. At least one EEC is used between two nodes. Multiple RD QPs can then share a single EEC when communicating between two nodes. This communication Service Type provides much better scaling when multiple processes (P) need to communicate between multiple nodes (N). The scaling for RC QPs is $P^2 \times N$ vs $P+N$ for RD QPs.

RD QPs are associated with EECs through the Reliable Datagram Domain (RDD). The Reliable Datagram Domain effectively provides a means of restricting access to a specific EEC. Although a consumer may be able to guess at an EEC, it has no way of changing the RD QP's RDD, because it is outside the scope of the consumer.

QPs supporting any of the four SAN transports have to reside in one, and only one, SAN partition. The SAN partition's P_Key is placed in the QP context. A SAN fabric would provide greater partitioning flexibility, if all SAN transports allowed their QPs to directly communicate on multiple partitions. However, the hardware resources needed to check the P_Key of incoming packets against all the P_Keys the HCA has access to is prohibitive.

This invention describes an enhancement to the SAN Reliable Datagram Transport which allows RD QPs to communicate on multiple partitions. The enhancement is to use the SAN RDD field to associate a QP to the P_Key associated with the underlying EEC. The P_Key is not stored in the QP Context, only the RDD is. The EEC contains both the P_Key and the RDD. Finally, the RDD is placed outside the consumer's context. That is, the consumer cannot access the RDD directly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

Figure 1:
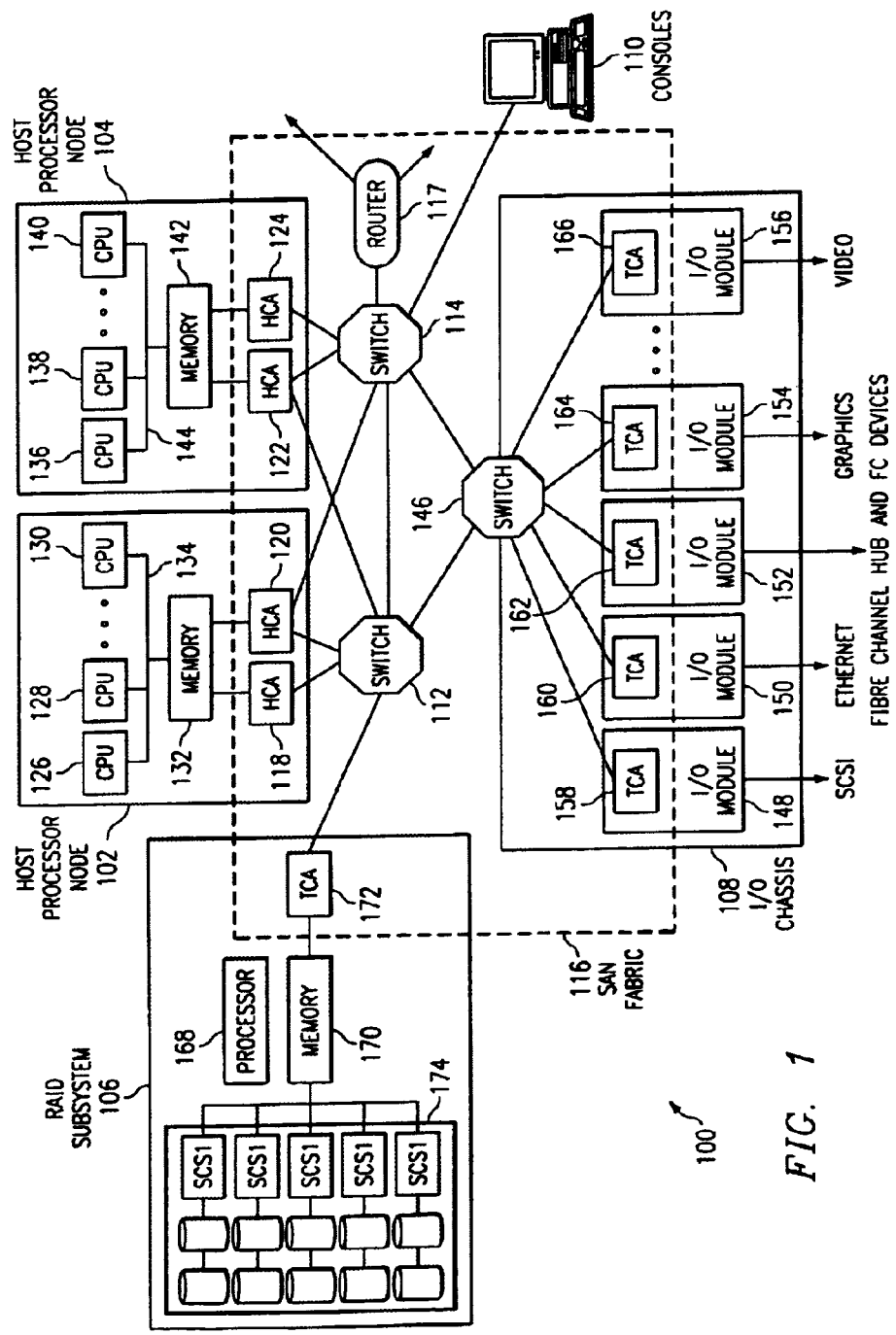
FIG. 1 is a diagram of a network computing system is illustrated in accordance with a preferred embodiment of the present invention.

With reference now to the figures and in particular with reference to FIG. 1, a diagram of a network global change computing system is illustrated in accordance with a preferred embodiment of the present invention. The distributed computer system represented in FIG. 1 takes the form of a system area network (SAN) 100 and is pro-vided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example of suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 include an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

Figure 2:
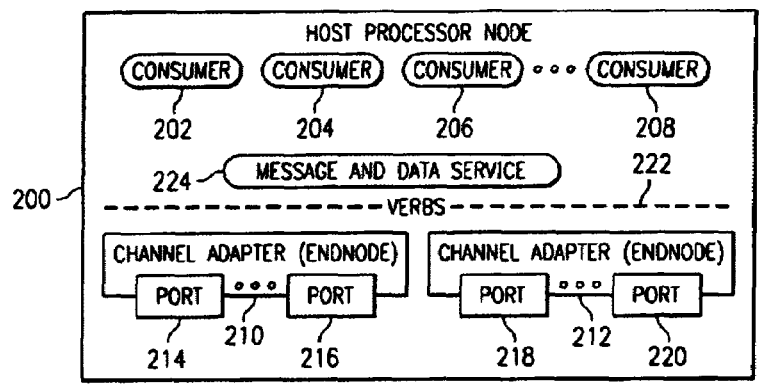
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212. Message and data service 224 provides an interface to consumers 202–208 to process messages and other data.

Figure 3:
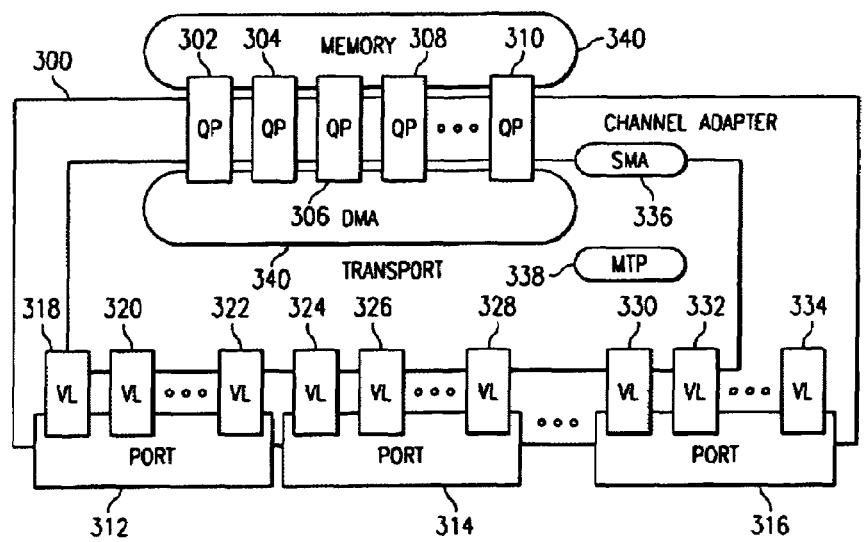
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
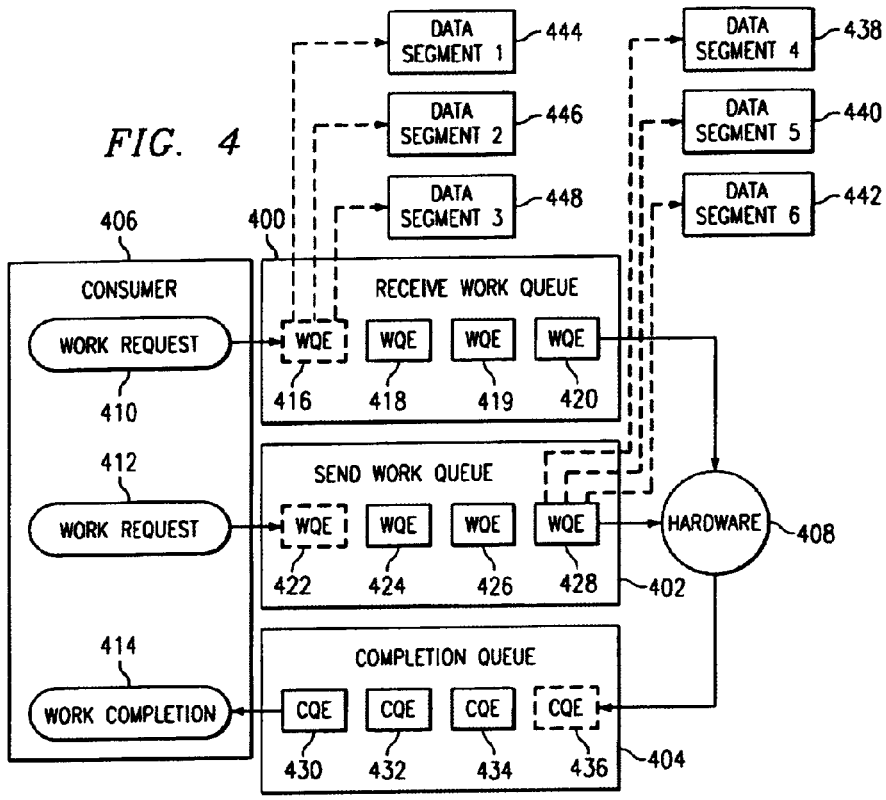
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services.

Reliable and Unreliable connected services associate a local queue pair with one and only one remote queue pair. Connected services require a process to create a queue pair for each process which is to communicate over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Reliable datagram service associates a local end—end (EE) context with one and only one remote end—end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N−1) EE contexts on each node for exactly the same communications.

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 5:
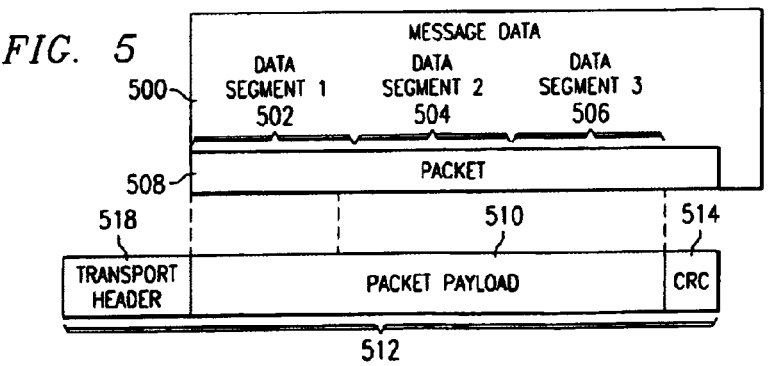
FIG. 5 is an illustration of a data packet in accordance with a preferred embodiment of the present invention.

Turning next to FIG. 5, an illustration of a data packet is depicted in accordance with a preferred embodiment of the present invention. Message data 500 contains data segment 1 502, data segment 2 504, and data segment 3 506, which are similar to the data segments illustrated in FIG. 4. In this example, these data segments form a packet 508, which is placed into packet payload 510 within data packet 512. Additionally, data packet 512 contains CRC 514, which is used for error checking. Additionally, routing header 516 and transport 518 are present in data packet 512. Routing header 516 is used to identify source and destination ports for data packet 512. Transport header 518 in this example specifies the destination queue pair for data packet 512. Additionally, transport header 518 also provides information such as the operation code, packet sequence number, and partition for data packet 512. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an endnode may be configured to be members of one or more possibly overlapping sets called partitions.

If a reliable transport service is employed, when a request packet reaches its destination endnode, acknowledgment packets are used by the destination endnode to let the request packet sender know the request packet was validated and accepted at the destination. Acknowledgment packets acknowledge one or more valid and accepted request packets. The requester can have multiple outstanding request packets before it receives any acknowledgments. In one embodiment, the number of multiple outstanding messages is determined when a QP is created.

FIGS. 6, 4, 5, and 7 together illustrate example request and acknowledgment transactions.

Figure 6:
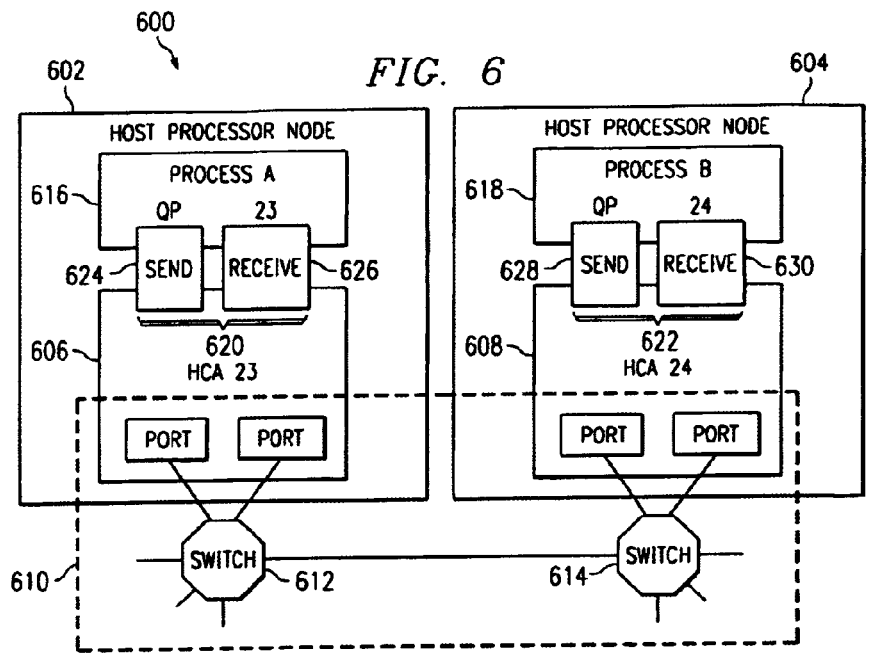
FIG. 6 is a diagram of a communication over a portion of a SAN fabric.

Referring to FIG. 6, a schematic diagram illustrating a portion of a distributed computer system is depicted in accordance with the present invention. The distributed computer system 600 in FIG. 6 includes a host processor node 602 and a host processor node 604. Host processor node 602 includes a HCA 606 and host processor node 604 includes a HCA 608. The distributed computer system 600 in FIG. 6 includes a SAN fabric 610 which includes a switch 612 and a switch 614. The SAN fabric 610 in FIG. 6 includes a link coupling HCA 606 to switch 612; a link coupling switch 612 to switch 614; and a link coupling HCA 608 to switch 614.

In the example transactions, host processor node 602 includes a client process A 616, and host processor node 604 includes a client process B 618. Client process A 616 interacts with HCA hardware 606 through QP 620. Client process B 618 interacts with HCA hardware 608 through QP 622. QP 620 and QP 622 are data structures. QP 620 includes include a send work queue 624 and a receive work queue 626. QP 622 includes include a send work queue 628 and a receive work queue 630.

Process A 616 initiates a message request by posting WQEs to the send queue 624 of QP 620. Such a WQE is illustrated by WQE 428 in FIG. 4. The message request of client process A 616 is referenced by a gather list contained in the send WQE 428. Each data segment in the gather list points to a virtually contiguous local memory region, which contains a part of the message. This is indicated by data segments 4 438, 5 440, and 6 442, which respectively hold message parts 4, 5, and 6.

Hardware in HCA 606 reads the WQE and segments the message stored in virtual contiguous buffers into packets, such as packet 512 in FIG. 5. Packets are routed through the SAN fabric 610, and for reliable transfer services, are acknowledged by the final destination endnode, which in this case is host processor node 604. If not successively acknowledged, the packet is retransmitted by the source endnode, host processor node 602. Packets are generated by source endnodes and consumed by destination endnodes.

Figure 7:
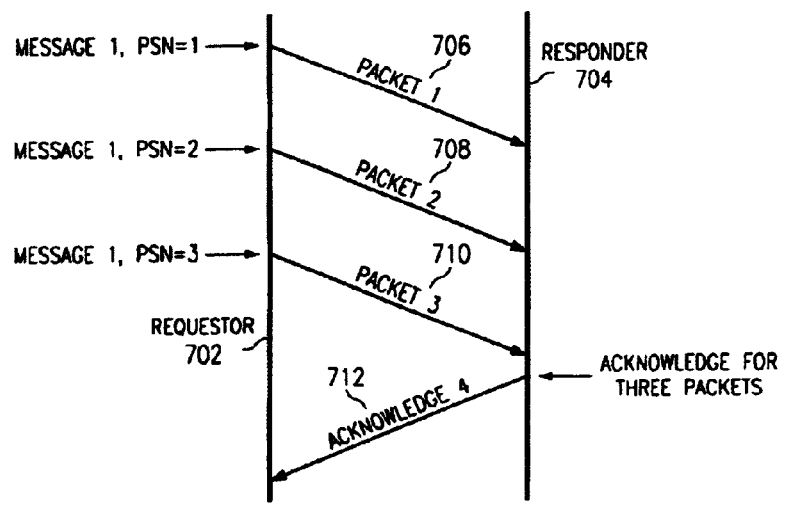
FIG. 7 is a diagram illustrating packet transfers.

Referring now to FIG. 7, the send request message is transmitted from source endnode 702 to destination endnode 704 as packets 1 706, 2 708, 3 710, and 4 712. Acknowledgment packet 4 712 acknowledges that all 4 request packets were received.

The message in FIG. 7 is being transmitted with a reliable transport service. Switches (and routers) that relay the request and acknowledgment packets do not generate any packets, only the source and destination HCAs do (respectively).

This invention describes how the SAN Reliable Datagram Queue Pairs (RD QPs) can be associated with one or more End—End Contexts at the local Host Channel Adapter and in the process removing the need to associate RD QPs to a specific partition, but rather to use the partition association of the underlying End—End Context.

Figure 8:
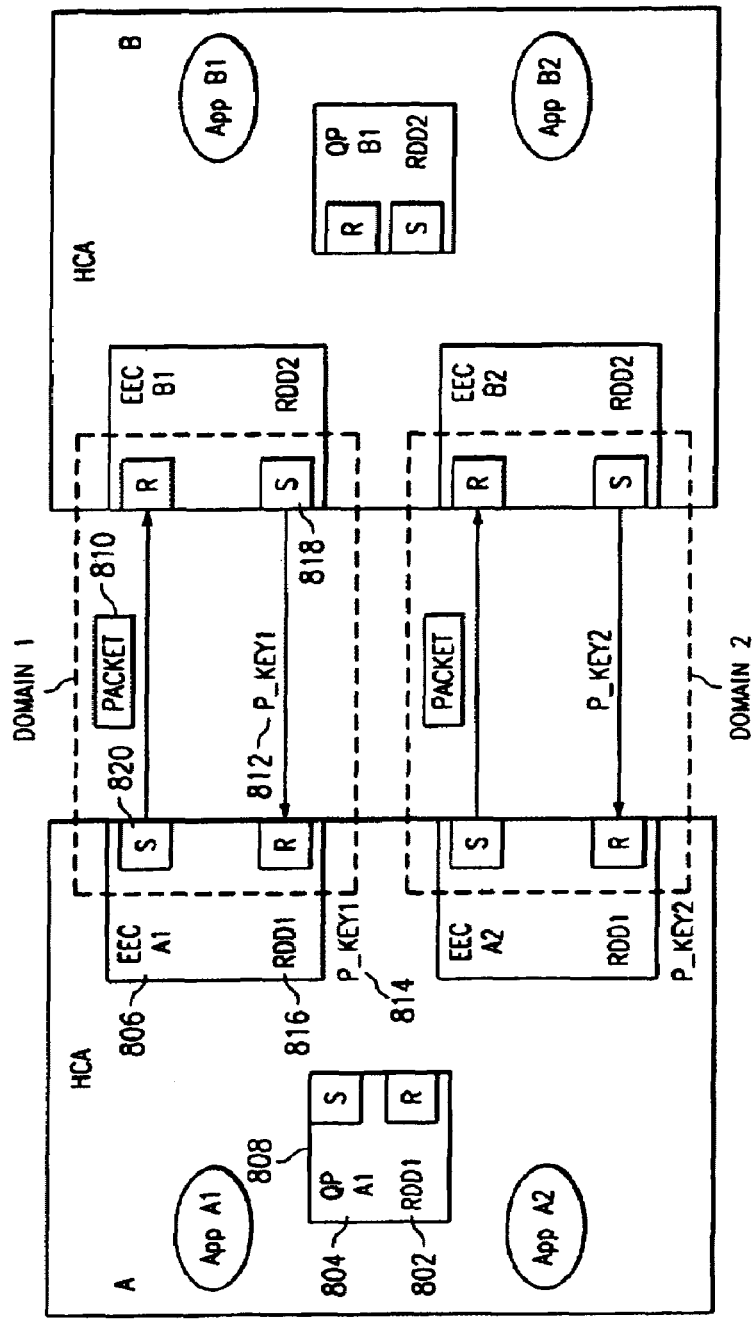
FIG. 8 is a diagram illustrating SAN Reliable Datagram Queue Pairs being associated with one or more End-to-End Contexts at the local host channel adapter.

Referring now to FIG. 8, the SAN fabric provides direct user access to network message passing hardware. For four of the five SAN Service Types, a consumer process is given one, or more, QPs which are dedicated to the consumer. The four SAN Service Types which provide this level of access control are: Reliable Connected, Unreliable Connected, Unreliable Datagram, and Raw Datagram.

For the SAN Reliable Datagram (RD) Service Type, each SAN consumer gets one, or more, dedicated QPs. However, the RD QPs rely on an underlying HCA facility to provide the reliability attributes. This underlying facility is the SAN End-to-End Context (EEC). At least one EEC is used between two nodes. Multiple RD QPs can then share a single EEC when communicating between two nodes. This communication Service Type provides much better scaling when multiple processes (P) need to communicate between multiple nodes (N). The scaling for RC QPs is $p^2 \times N$ vs. P+N for RD QPs.

RD QPs are associated with EECs through the Reliable Datagram Domain (RDD). The RDD effectively provides a means of restricting access to a specific EEC. Although a consumer may be able to guess at an EEC, it has no way of changing the RD QP's RDD, because it is outside the scope of the consumer.

QPs supporting any of the four SAN transports have to reside in one, and only one, SAN partition. The SAN partition's P_Key is placed in the QP context. SAN would provide greater partitioning flexibility, if all SAN transports allowed their QPs to communicate directly on multiple partitions. However, the hardware resources needed to check the P_Key of incoming packets against all the P_Keys that the HCA has access to is prohibitive.

This invention describes an enhancement to the SAN Reliable Datagram Transport which allows RD QPs to communicate on multiple partitions. The enhancement is to use the SAN RDD field to associate a QP 804 to the P_Key 814 associated with the underlying EEC 806. The P_Key 814 is not stored in the QP Context 808, only the RDD 802 is. The EEC contains both the P_Key 814 and the RDD 816. In this example, RDD's 802 and 816 are identical. Finally, the RDD is placed outside the consumer's context. That is, the consumer cannot access the RDD directly.

Figure 9:
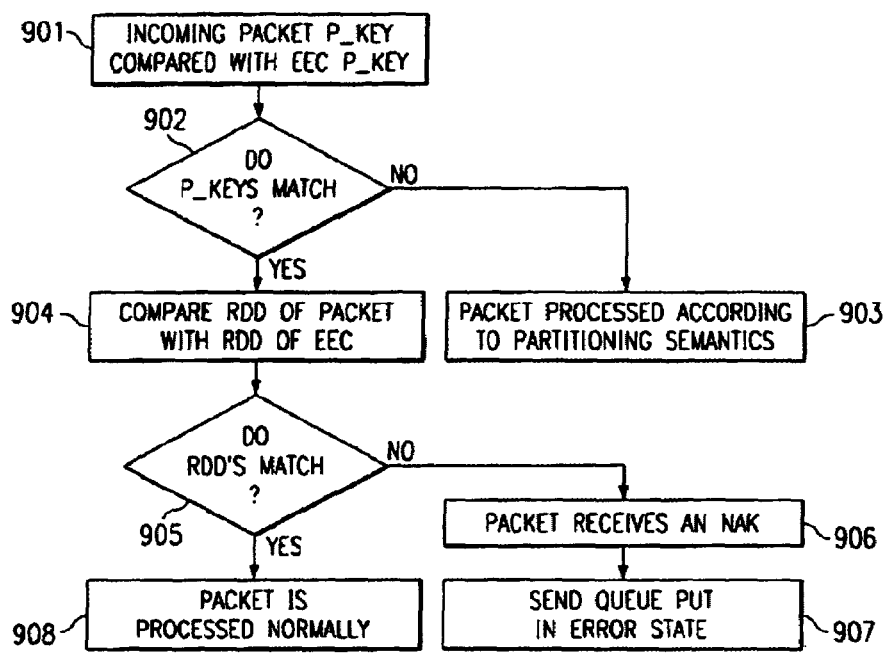
FIG. 9 depicts a flowchart illustrating a method for associating RD QP's with an EEC for incoming messages in accordance with the present invention.

Referring to FIG. 9, a flowchart illustrating a method for associating RD QP's with an EEC for incoming messages is depicted in accordance with the present invention.

On incoming messages (packets) 810, the following checks are made (in addition to the other packet validation checks made on the packet):

The incoming message's P_Key 812 is compared against the P_Key 814 stored in the End—End Context 806 (step 901). If the P_Keys 812 and 814 do not match, the erroneous packet 810 is processed in accordance with San partitioning semantics (step 903). If the P_Key check matches, then the RDD 802 of the RD QP 804 is compared with the RDD 816 in the EEC 806 (step 904). If the RDDs 802 and 816 do not match, then the packet 810 is "NAK'ed" (Negative AcKnowledgment) with a RDD violation (step 906). The packet initiator upon receiving the RDD Violation NAK places the Send Queue 818 which emitted the erroneous packet in the Send Queue Error state (step 907). The packet recipient (which performed the above incoming checks) does not consume any Receive Queue work queue elements and leaves the QP in the normal (Ready To Send) state. If the RDDs 802 and 816 do match, then the packet 810 is processed normally (step 908).

Figure 10:
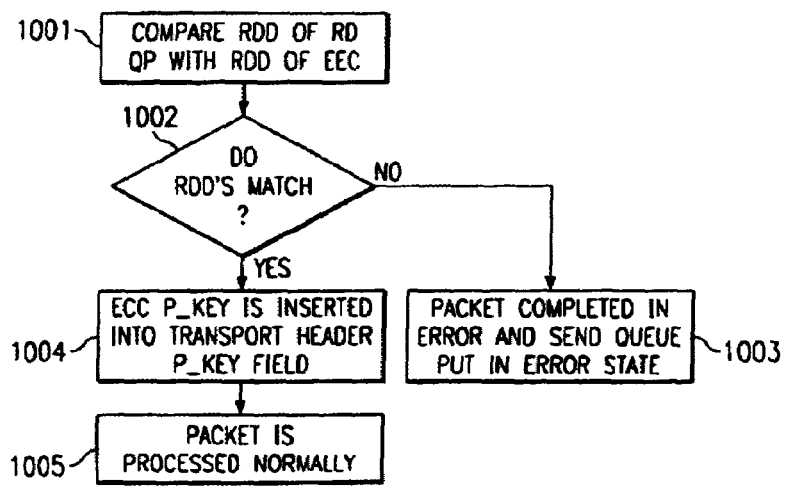
FIG. 10 depicts a flowchart illustrating a method for associating RD QP' with an EEC for outgoing messages in accordance with the present invention.

Referring now to FIG. 10, a flowchart illustrating a method for associating RD QP' with an EEC for outgoing messages is depicted in accordance with the present invention.

On outgoing messages, the following check is made (in addition to the other work request validation checks) and the following field is inserted into the SAN Transport header (in addition to the other fields inserted into the packet). The RDD 802 of the RD QP 804, which contains the work request, is compared with the RDD 816 in the EEC (step 1001). If the RDDs 802 and 816 don't match, then the packet 810 is completed in error and the QP's Send Queue 820 is placed in the Send Queue Error state (step 1003). If the RDD's 802 and 816 do match, then the EEC's P_Key 814 is inserted into the SAN Transport Header's P_Key field (step 1004) and the packet 810 is processed normally (step 1005).

There are some additional optimizations that can be done. For example, some lower-end systems may want to minimize the amount of state that needs to be processed by the HCA for inbound/outbound RD messages. On these systems, the HCA supports only two RDD numbers: one for kernel and one for the user. The kernel RDD can only be used by kernel code. User level code cannot access the kernel RDD, because the HCA Driver does not place the kernel RDD in user level QPs and EECs. Instead the HCA Driver places the user space RDD in the QP contexts and EECs used by user level consumer processes. Whereas for kernel code, the HCA Driver places kernel level RDD in kernel QP contexts and EECs. Another example for higher-end systems that want to provide a finer level of access control, one RDD is used for kernel and one RDD is used per consumer process. On these systems, the HCA has sufficient resources to support many RDD numbers. Again, the kernel RDD can only be used by kernel code. User level code cannot access the kernel RDD, because the HCA Driver does not place the kernel RDD in user level QPs and EECs. Instead the HCA Driver places associated consumer process (es) to a specific RDD, and then stores that specific RDD in the QP contexts and EECs used by the user level consumer process(es).

This invention allows Reliable Datagram QPs to be used for communicating across multiple partitions. All other QPs supporting SAN fabric Service Types are associated to a partition and cannot communicate to QPs that are outside of the partition which the QP is associated with. This is true even if the node's HCA port, which the QP uses, has access to different partitions. RD QPs can communicate with any given partition the node's HCA has access to, so long as there is an underlying End—End Context which is associated with the given partition. This invention also removes the need to check Partition Keys twice, once for the QP and once for the End—End Context.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for associating reliable datagram queue pairs with an underlying end-to-end context of a channel adapter, comprising:
   storing a reliable datagram domain within the reliable datagram queue pair context;
   storing the same reliable datagram domain within the end-to-end context; and
   storing a partition key within the end-to-end context.

2. The method according to claim 1, wherein a consumer process cannot directly access the reliable datagram domain.

3. The method according to claim 1, in the case of incoming messages, further comprising:
   comparing the partition key of an incoming data packet with the partition key of the end-to-end context;
   if the partition keys match, comparing the reliable datagram domain of the queue pair with the reliable datagram domain of the end-to-end context; and
   if the reliable datagram domains match, processing the packet normally.

4. The method according to claim 3, wherein the step of comparing the partition keys of the packet and end-to-end context further comprises processing the packet according to InfiniBand partitioning semantics, if the partition keys do not match.

5. The method according to claim 3, wherein the step of comparing the reliable datagram domains of the queue pair and end-to-end context further comprises:
   giving a negative acknowledgment to the data packet, if the reliable datagram domains do not match; and
   placing the send queue in an error state.

6. The method according to claim 1, in the case of outgoing messages further comprising:
  comparing the reliable datagram domain of the queue pair with the reliable datagram domain of the end-to-end context; and
  if the reliable datagram domains match, inserting the partitioning key of the end-to-end context into the transport header of the data packet.

7. The method according to claim 6, further comprising: completing the packet in error, if the reliable datagram domains do not match; and
  placing the send queue in an error state.

8. The method according to claim 1, further comprising storing reliable datagram domain numbers for:
  kernel code; and
  user code;
  wherein the kernel reliable datagram domain can only be used by kernel code.

9. The method according to claim 1, further comprising storing reliable datagram domain numbers for:
  kernel code; and
  consumer processes;
  wherein the kernel reliable datagram domain can only be used by kernel code.

10. A computer program product in a computer readable medium for use in a data processing system for associating reliable datagram queue pairs with an underlying end-to-end context of a channel adapter, the computer program product comprising:
  instructions for storing a reliable datagram domain within the reliable datagram queue pair context;
  instructions for storing the same reliable datagram domain within the end-to-end context; and
  instructions for storing a partition key within the end-to-end context.

11. The computer program product according to claim 10, wherein a consumer process cannot directly access the reliable datagram domain.

12. The computer program product according to claim 10, in the case of incoming messages, further comprising:
  instructions for comparing the partition key of an incoming data packet with the partition key of the end-to-end context;
  if the partition keys match, instructions for comparing the reliable datagram domain of the queue pair with the reliable datagram domain of the end-to-end context; and
  if the reliable datagram domains match, instructions for processing the packet normally.

13. The computer program product according to claim 12, wherein the instructions for comparing the partition keys of the packet and end-to-end context further comprise instructions for processing the packet according to InfiniBand partitioning semantics, if the partition keys do not match.

14. The computer program product according to claim 12, wherein the instructions for comparing the reliable datagram domains of the queue pair and end-to-end context further comprises:
  instructions for giving a negative acknowledgment to the data packet, if the reliable datagram domains do not match; and
  instructions for placing the send queue in an error state.

15. The computer program product according to claim 10, in the case of outgoing messages, further comprising:
  instructions for comparing the reliable datagram domain of the queue pair with the reliable datagram domain of the end-to-end context; and
  instructions for if the reliable datagram domains match, inserting the partitioning key of the end-to-end context into the transport header of the data packet.

16. The computer program product according to claim 15, further comprising:
  instructions for completing the packet in error, if the reliable datagram domains do not match; and
  instructions for placing the send queue in an error state.

17. The computer program product according to claim 10, further comprising instructions for storing reliable datagram domain numbers for:
  kernel code; and
  user code;
  wherein the kernel reliable datagram domain can only be used by kernel code.

18. The computer program product according to claim 10, further comprising instructions for storing reliable datagram domain numbers for:
  kernel code; and
  consumer processes;
  wherein the kernel reliable datagram domain can only be used by kernel code.

19. A system for associating reliable datagram queue pairs with an underlying end-to-end context of a channel adapter, comprising:
  means for storing a reliable datagram domain within the reliable datagram queue pair context;
  means for storing the same reliable datagram domain within the end-to-end context; and
  means for storing a partition key within the end-to-end context.

20. The system according to claim 19, in the case of incoming messages, further comprising:
  means for comparing the partition key of an incoming data packet with the partition key of the end-to-end context;
  if the partition keys match, means for comparing the reliable datagram domain of the queue pair with the reliable datagram domain of the end-to-end context; and
  if the reliable datagram domains match, means for processing the packet normally.

21. The system according to claim 19, in the case of outgoing messages, further comprising:
  means for comparing the reliable datagram domain of the queue pair with the reliable datagram domain of the end-to-end context; and
  if the reliable datagram domains match, means for inserting the partitioning key of the end-to-end context into the transport header of the data packet.

* * * * *